Patented Apr. 9, 1940

2,196,745

UNITED STATES PATENT OFFICE 2,196,745

AZO COMPOUNDS AND PROCESS FOR COLORING THEREWITH

Joseph B. Dickey and John R. Byers, Jr., Rochester, N. Y., assignors to Eastman Kodak Company, Rochester, N. Y., a corporation of New Jersey No Drawing. Application June 1, 1938, Serial No. 211,269

15 Claims. (Cl. 8—50)

This invention relates to aromatic azo compounds of a cyclohomotetronic acid and their application to the art of dyeing or coloring.

We have discovered that the aromatic azo compounds of a cyclohomotetronic acid constitute valuable dyes for the dyeing or coloration of organic derivatives of cellulose, wool and silk. Both the sulfonated and unsulfonated azo compounds of our invention can be employed to dye wool and silk. For the dyeing of organic derivatives of cellulose, however, the azo dye compounds should contain no nuclear sulfonic acid group since the nuclear sulfonic acid azo dye compounds have little or no affinity for organic derivatives of cellulose. As respects the application of the azo dye compounds, our invention is more particularly directed to the dyeing or coloring of organic derivatives of cellulose with the nuclear non-sulfonated azo compounds of our invention.

Organic derivatives of cellulose are characterized by an indifferent affinity for the usual cotton and wool dyes especially the ordinary water soluble dyes. Because of this, it has been necessary to develop new dye compounds suitable for the dyeing or coloration of material such as textile materials made of or containing an organic derivative of cellulose. It is, accordingly, an object of our invention to provide a new class of azo dyes suitable for the dyeing or coloration of organic derivatives of cellulose.

Another object of our invention is to provide a process for the dyeing or coloration of organic derivatives of cellulose. A further object is to provide a process for the coloration of organic derivatives of cellulose in which the dye or dyes are applied directly to the material undergoing coloration from an aqueous suspension. A still further object is to produce dyeings on organic derivatives of cellulose which are of good fastness to light and washing.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose, or benzyl cellulose.

The aromatic azo dye compounds of our invention can be prepared by coupling a diazotized aromatic amine with a cyclohomotetronic acid capable of coupling.

The expression "a cyclohomotetronic acid" includes cyclohomotetronic acid as well as substituted cyclohomotetronic acids, such as 5-dimethyl-6-methylcyclohomotetronic acid, 5-methyl-6-methylcyclohomotetronic acid, 5-phenylcyclohomotetronic acid, 6-methylcyclohomotetronic acid, 5-cyclohexyl-6-methylcyclohomotetronic acid, 5-furfurylcyclohomotetronic acid, 5-methylethyl-6-methylcyclohomotetronic acid, 6-furfurylcyclohomotetronic acid, 5-allylcyclohomotetronic acid, and 5-β-methoxyethyl-6-methylcyclohomotetronic acid, for example. It will be understood, of course, that the above list of cyclohomotetronic acid compounds is merely illustrative of such compounds and is not intended to be limitative of our invention.

Any diazotized aromatic amine and any cyclohomotetronic acid capable of coupling can be employed in the preparation of the azo dye compounds of our invention. While, as above shown, cyclohomotetronic acid as well as substituted cyclohomotetronic acids may be employed, the cyclohomotetronic acid must not contain a substituent preventing coupling. To enable coupling to occur, the cyclohomotetronic acid nucleus must not have its 3 or coupling position blocked and consequently compounds having a substituent in the 3 position preventing coupling cannot be employed to prepare azo dye compounds of our invention. Ordinarily, cyclohomotetronic acids unsubstituted in the 3 position will be used in the preparation of the azo dye compounds of the invention.

In order that our invention may be clearly understood, the formula and the numbering of the cyclohomotetronic acid nucleus is as follows:

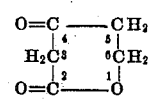

This numbering is that which will be employed throughout.

The azo dye compounds of our invention have the general formula R—N=N—R₁ wherein R represents the residue of an aromatic diazo component and R₁ represents the residue of a cyclohomotetronic acid. Advantageously, R represents the residue of a phenyl nucleus.

While our invention relates broadly to the azo dye compounds having the above general formula, it relates more particularly to the azo dye compounds having the general formula:

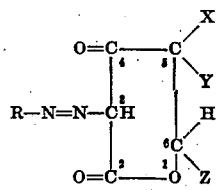

wherein X, Y and Z represent hydrogen, an alkyl group, a cycloalkyl group, an aryl group, an alkylene radical or a heterocyclic group and R has the meaning previously assigned to it.

The term "alkyl", as used above, includes not only unsubstituted alkyl radicals such as the methyl radical, the ethyl radical, a propyl radical or a butyl radical, but also substituted alkyl radicals such as, for example, the hydroxyethyl radical, the β-hydroxypropyl radical, the λ-hydroxypropyl radical, a hydroxybutyl radical, or a dihydroxypropylene radical such as β-λ-hydroxypropyl, halogen alkyl radicals, such as the chloro-, bromo- or iodo-ethyl radicals or the chloro-, bromo- or iodo-propyl radicals and the radicals of β-methoxyethyl, β-ethoxyethyl or β-acetoxyethyl, for example.

The expression "a phenyl nucleus" appearing in the specification and claims is intended to include not only the phenyl nucleus but also substituted phenyl nuclei.

The nuclear non-sulfonated aromatic azo compounds of our invention yield shades on organic derivatives of cellulose ranging from greenish yellow to red of good fastness to light and washing. These compounds as well as the sulfonated compounds of our invention likewise yield shades ranging from greenish yellow to red on wool and silk textile materials.

The following examples illustrate the preparation of the azo compounds of our invention.

EXAMPLE 1

12.3 grams of o-anisidine are dissolved in 150 grams of water to which 25 cc. of 36% hydrochloric acid has been added. The resulting solution is cooled to a temperature approximating 0–5° C. and diazotized, while maintaining this temperature, by the addition, with stirring, of a water solution of 6.9 grams of sodium nitrite.

15.6 grams of 5-dimethyl-6-methylcyclohomotetronic acid are dissolved in 200 cc. of water containing 30 grams of sodium carbonate. The resulting solution is cooled to a temperature approximating 0–10° C. by the addition of ice, for example, and the diazo solution prepared above is slowly added with stirring. Upon completion of the coupling reaction which takes place, the mixture is made slightly acid to litmus by the addition of a mineral acid such as hydrochloric acid or an organic acid such as acetic acid and the dye compound which has been formed is recovered by filtration, washed with water and dried. It has the formula:

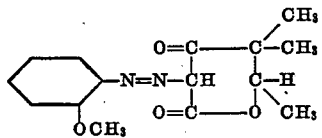

and colors cellulose acetate silk a greenish yellow shade.

EXAMPLE 2

18.2 grams of 2-methoxy-4-chloroaniline are diazotized and the diazonium compound obtained is coupled with 14.2 grams of 5-methyl-6-methylcyclohomotetronic acid dissolved in a dilute sodium carbonate water solution. The diazotization, coupling and recovery of the dye compound may be carried out in accordance with the general method described in Example 1. The dye compound obtained has the formula:

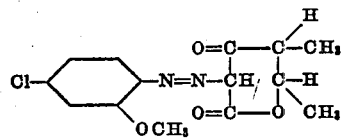

and colors cellulose acetate silk a greenish yellow shade of good fastness to light and washing.

EXAMPLE 3

24.1 grams of 2,4-di-β-methoxyethoxyaniline are diazotized and the diazonium compound obtained is coupled with 12.8 grams of 6-methylcyclohomotetronic acid. The diazotization, coupling and recovery of the dye compound formed may be carried out in accordance with the general procedure set forth in Example 1. The dye compound obtained has the formula:

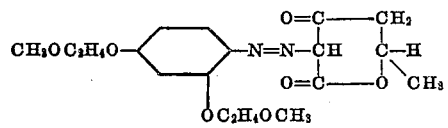

and colors cellulose acetate silk a greenish yellow shade of good fastness to light and washing.

EXAMPLE 4

16.9 grams of 2-methoxy-4-nitroaniline are diazotized and the diazonium compound obtained is coupled with 11.4 grams of cyclohomotetronic acid. The coupling and recovery of the dye compound formed may be carried out in accordance with the general method set forth in Example 1. The dye compound obtained has the formula:

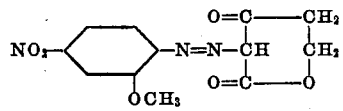

and colors cellulose acetate silk a greenish yellow shade of good fastness to light and washing.

EXAMPLE 5

17.3 grams of 1-amino-2-nitro-4-chlorobenzene are diazotized and the diazonium compound obtained is coupled with 20.4 grams of 5-phenyl-6-methylcyclohomotetronic acid. The dye compound obtained in accordance with this example has the formula:

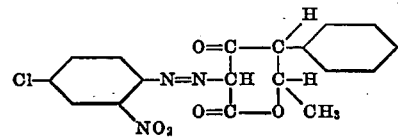

and colors cellulose acetate silk a greenish yellow shade of good fastness to light and washing.

EXAMPLE 6

20.1 grams of p-aminoazobenzene are diazotized in any known suitable manner and the diazonium compound obtained is coupled with 21 grams of 5-cyclohexyl-6-methylcyclohomotetronic acid dissolved in a cold dilute sodium hydroxide water solution. Coupling and recovery of the dye compound may be carried out in accordance with the general method set forth in Example 1. The dye compound obtained has the formula:

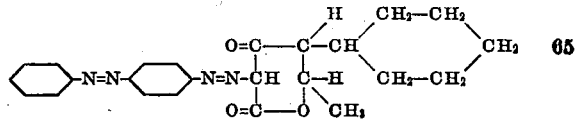

and colors cellulose acetate silk a yellow shade of good fastness to light and washing.

EXAMPLE 7

24.6 grams of dianisidine are diazotized and the diazonium compound formed is coupled with 37.2 grams of 5-β-methoxyethyl-6-methylcyclohomotetronic acid. The dye compound obtained has the formula:

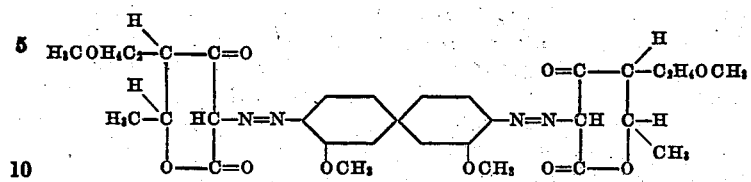

and colors cellulose acetate silk a greenish yellow shade.

EXAMPLE 8

21.8 grams of 1-amino-2-nitrobenzenesulfonic acid are diazotized and the diazonium compound obtained is coupled with 21.9 grams of 5-furfuryl-6-methylcyclohomotetronic acid. The coupling reaction and recovery of the dye compound formed may be carried out in accordance with the general method set forth in Example 1. The dye compound obtained has the formula:

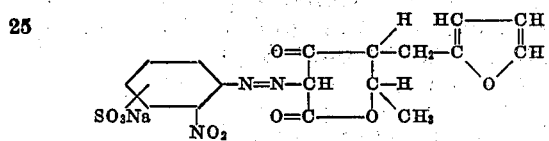

This compound is not suitable for the dyeing of organic derivatives of cellulose, such as cellulose acetate silk, but yields a greenish yellow shade on wool and silk textile materials.

In order that our invention may be fully understood, the preparation of a number of intermediate substances employed in the manufacture of the compounds of the invention is disclosed hereinafter.

*Preparation of 5-dimethyl-6-methylcyclohomotetronic acid*

This compound may be prepared as described in Liebig's Annalen, vol. 462, pages 97–104 inclusive (1928).

*Preparation of 6-methylcyclohomotetronic acid*

One gram mole of

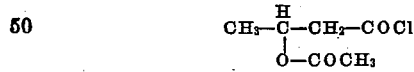

is treated with one gram mole of sodium ethyl malonate. When the reaction which takes place is complete, the resulting compound formed, 6-methyl-3-carbethoxyhomotetronic acid, is hydrolyzed with sodium hydroxide at 50° C. for 24 hours. The resulting mixture is then made acid to litmus by the addition of hydrochloric acid and the 6-methylcyclohomotetronic acid formed is separated and purified by distillation.

6-ethylcyclohomotetronic acid can likewise be prepared by the substitution of

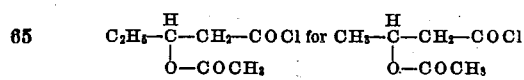

in the above reaction.

*Preparation of cyclohomotetronic acid*

This compound may be prepared by reacting one gram mole of

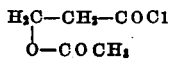

with one gram mole of sodium ethyl malonate in accordance with the directions given in connection with the preparation of 6-methylcyclohomotetronic acid.

*Preparation of 6-phenylcyclohomotetronic acid*

This compound may be obtained by reacting one gram mole of

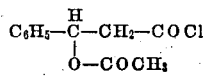

with one gram mole of sodium ethyl malonate. The reaction and recovery of the product may be carried out in accordance with the directions given in connection with the preparation of 6-methylcyclohomotetronic acid.

*Preparation of 5-β-methoxyethylcyclohomotetronic acid*

This compound may be prepared by reacting one gram mole of

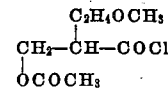

with one gram mole of sodium ethyl malonate in accordance with the procedure given in connection with the preparation of 6-methylcyclohomotetronic acid.

*Preparation of 6-tetrahydrofurfuryl-5-allylcyclohomotetronic acid*

This compound may be prepared by reacting one gram mole of

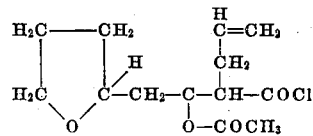

with one gram mole of sodium ethyl malonate in accordance with the directions given in connection with the preparation of 6-methylcyclohomotetronic acid.

From the foregoing examples illustrating the preparation of a number of cyclohomotetronic acid compounds which may be employed in the preparation of the azo compounds of our invention, it will be apparent how various other cyclohomotetronic acid compounds may be prepared.

The following tabulation further lists representative compounds included within the scope of our invention together with the color they yield on cellulose acetate silk. The compounds indicated below may be prepared by diazotizing the amines listed under the heading "Amine" and coupling with the compounds specified in the column entitled "Coupling component."

do not, of course, require the use of a dispersing or solubilizing agent but may be applied to silk,

| Amine | Coupling component | Color on cellulose acetate silk |
|---|---|---|
| Aniline | 5-dimethyl-6-methylcyclohomotetronic acid | Greenish-yellow. |
| Do | 5-methyl-6-methylcyclohomotetronic acid | Do. |
| Do | 5-ethylcyclohomotetronic acid | Do. |
| Do | 6-methylcyclohomotetronic acid | Do. |
| Do | Cyclohomotetronic acid | Do. |
| Do | 5-methylethyl-6-methylcyclohomotetronic acid | Do. |
| Do | 5-phenyl-6-methylcyclohomotetronic acid | Do. |
| Do | 5-cyclohexyl-6-methylcyclohomotetronic acid | Do. |
| Do | 5-furfuryl-6-methylcyclohomotetronic acid | Do. |
| Do | 5-$\beta$-methoxyethyl-6-methylcyclohomotetronic acid. | Do. |
| Do | 5-allyl-6-methylcyclohomotetronic acid | Do. |
| o-m-p-Anisidine | 1-11 above | Do. |
| o-m-p-Aminodiphenyl ether | do | Do. |
| o-m-p-$\beta$-Alkoxy-alkoxyaniline | do | Do. |
| o-m-p-$\beta$-Hydroxy-alkoxyaniline | do | Do. |
| o-m-p-Toluidine | do | Do. |
| o-m-p-Aminobenzyl alcohol | do | Do. |
| o-m-p-Haloaniline | do | Do. |
| 2-methoxy-4-chloroaniline | do | Do. |
| 4-ethoxy-2-chloro-aniline | do | Do. |
| 4-methoxy-2-methyl aniline | do | Do. |
| 2,4-dichloraniline | do | Do. |
| 2-methoxy-6-nitroaniline | do | Do. |
| 2,5-dimethoxyaniline | do | Do. |
| 2,4-dinitro-6-haloaniline | do | Do. |
| p-Aminoacetophenone | do | Do. |
| 1-amino-2-methoxy-4-acetobenzene | do | Do. |
| 4-nitro-2-chloroaniline | do | Do. |
| m - Aminobenzenesulfonamide $\alpha$ - naphthylamine. | do | Do. |
| p-Amino-N-dibutylbenzamide | do | Do. |
| p-Aminodiethylaniline | do | Red. |
| p-Aminoazobenzene | do | Yellow. |
| 5-nitro-2-aminophenyl-methylsulfone | do | Greenish-yellow. |
| p-Aminobenzophenone | do | Do |
| 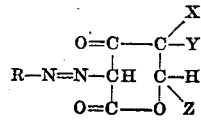 | do | Do. |
| 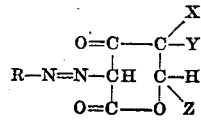 | do | Do. |

The above dye compounds color silk and wool, the same or generally similar shades, as cellulose acetate. Sulfonated compounds corresponding to the above dye compounds, that is, in which the aromatic nucleus is sulfonated, may be prepared in known fashion. These sulfonated compounds are useful for the dyeing of wool and silk. As illustrative of sulfonated azo dye compounds included within the scope of our invention, may be mentioned the azo dye compounds obtained by coupling diazotized 2-amino-5-nitrobenzene sulfonic acid with the coupling components in the above tabulation. The dyes so obtained color wool and silk a greenish yellow shade.

It will be understood that the dye compounds disclosed herein are intended to be illustrative and not limitative of the invention. The aromatic nucleus may contain substituents other than those specifically disclosed. Similarly, the coupling component may contain substituents other than those specifically set forth.

The azo dye compounds of our invention are, for the most part, relatively insoluble in water. These compounds, which are insoluble in water, may be advantageously employed for the direct dyeing of textile materials by grinding the dye to a fine powder, intimately mixing it with a suitable dispersing or solubilizing agent and adding the resulting mixture to water or a dilute solution of soap in water to form an aqueous dyebath. Following this known preparation of the dyebath, the textile material to be dyed may be added to the dyebath and the dyeing operation conducted in known fashion. The dye compounds of our invention which are water soluble wool and (depending on the nature and position of the water solubilizing group) organic derivatives of cellulose textile materials from an aqueous solution of the dye which may contain salt. For a more complete description as to how the azo dye compounds of our invention may be employed in dyeing or coloring operations, reference may be had to United States Letters Patent No. 2,115,030, issued April 26, 1938 to James G. McNally and Joseph B. Dickey.

We claim:

1. The azo compounds having the general formula R–N=N–R₁, wherein R represents the residue of a member selected from the group consisting of an aryl nucleus of the benzene series, an aryl nucleus of the naphthalene series, a benzothiazole nucleus and a thiazole nucleus and R₁ represents the residue of a cyclohomotetronic acid capable of coupling.

2. The azo compounds having the general formula R–N=N–R₁, wherein R represents the residue of a phenyl nucleus and R₁ represents the residue of a cyclohomotetronic acid capable of coupling.

3. The azo compounds having the general formula R–N=N–R₁, wherein R represents the residue of a phenyl nucleus and R₁ represents the residue of cyclohomotetronic acid.

4. The azo compounds having the general formula:

$$\begin{array}{c} \phantom{R-N=N-}O=C-C\diagup^X_Y \\ R-N=N-CH\phantom{-}C-H \\ \phantom{R-N=N-}O=C-O\diagdown Z \end{array}$$

wherein R represents the residue of a phenyl nucleus and X, Y and Z each represents a substituent selected from the group consisting of hydrogen, an alkyl group, an aryl group, an alkylene radical, a cycloalkyl group and a furfuryl group.

5. The azo compounds having the general formula:

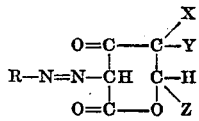

wherein R represents the residue of a member selected from the group consisting of an aryl nucleus of the benzene series, an aryl nucleus of the naphthalene series, a benzothiazole nucleus and a thiazole nucleus and X, Y and Z each represents a substituent selected from the group consisting of hydrogen, an alkyl group, an aryl group, an alkylene radical, a cycloalkyl group and a furfuryl group.

6. The azo dye compounds having the general formula R–N=N–R₁, wherein R represents the residue of a member selected from the group consisting of an aryl nucleus of the benzene series, an aryl nucleus of the naphthalene series, a benzothiazole nucleus and a thiazole nucleus and R₁ represents the residue of an alkyl substituted cyclohomotetronic acid capable of coupling.

7. The process of dyeing material made of or containing an organic derivative of cellulose which comprises applying thereto a nuclear non-sulfonated azo dye compound having the general formula R–N=N–R₁, wherein R represents the residue of a phenyl nucleus and R₁ represents the residue of a cyclohomotetronic acid capable of coupling.

8. The process of dyeing material made of or containing an organic derivative of cellulose which comprises applying thereto a nuclear non-sulfonated azo dye compound having the general formula:

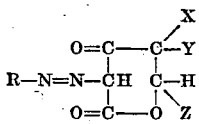

wherein R represents the residue of a member selected from the group consisting of an aryl nucleus of the benzene series, an aryl nucleus of the naphthalene series, a benzothiazole nucleus and a thiazole nucleus and X, Y and Z each represents a substituent selected from the group consisting of hydrogen, an alkyl group, an aryl group, an alkylene radical, a cycloalkyl group and a furfuryl group.

9. The process of dyeing a cellulose acetate which comprises applying thereto a nuclear non-sulphonated azo dye compound having the general formula:

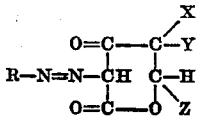

wherein R represents the residue of a member selected from the group consisting of an aryl nucleus of the benzene series, an aryl nucleus of the naphthalene series, a benzothiazole nucleus and a thiazole nucleus and X, Y and Z each represents a substituent selected from the group consisting of hydrogen, an alkyl group, an aryl group, an alkylene radical, a cycloalkyl group and a furfuryl group.

10. The process of dyeing a cellulose acetate which comprises applying thereto a nuclear non-sulphonated azo dye compound having the general formula:

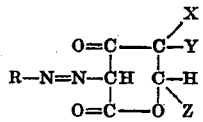

wherein R represents the residue of a phenyl nucleus and X, Y and Z each represents a substituent selected from the group consisting of hydrogen, an alkly group, an aryl group, an alkylene radical, a cycloalkyl group and a furfuryl group.

11. Material made of or containing an organic derivative of cellulose colored with a nuclear non-sulfonated azo dye compound having the general formula R–N=N–R₁, wherein R represents the residue of a member selected from the group consisting of an aryl nucleus of the benzene series, an aryl nucleus of the naphthalene series, a benzothiazole nucleus and a thiazole nucleus and R₁ represents the residue of a cyclohomotetronic acid capable of coupling.

12. Material made of or containing an organic acid ester or cellulose colored with a nuclear non-sulfonated azo dye compound having the general formula R–N=N–R₁, wherein R represents the residue of a phenyl nucleus and R₁ represents the residue of a cyclohomotetronic acid capable of coupling.

13. Cellulose acetate colored with a nuclear non-sulfonated azo dye compound having the general formula R–N=N–R₁, wherein R represents the residue of a member selected from the group consisting of an aryl nucleus of the benzene series, an aryl nucleus of the naphthalene series, a benzothiazole nucleus and a thiazole nucleus and R₁ represents the residue of a cyclohomotetronic acid capable of coupling.

14. Cellulose acetate colored with a nuclear non-sulfonated azo dye compound having the general formula R–N=N–R₁, wherein R represents the residue of a phenyl nucleus and R₁ represents the residue of a cyclohomotetronic acid capable of coupling.

15. Textile materials colored with a nuclear non-sulfonated azo dye compound having the general formula R–N=N–R₁, wherein R represents the residue of a member selected from the group consisting of an aryl nucleus of the benzene series, an aryl nucleus of the naphthalene series, a benzothiazole nucleus and a thiazole nucleus, and R₁ represents the residue of a cyclohomotetronic acid capable of coupling.

JOSEPH B. DICKEY.
JOHN R. BYERS, Jʀ.